United States Patent
Borlina et al.

(10) Patent No.: US 11,230,444 B2
(45) Date of Patent: Jan. 25, 2022

(54) TRANSITION ADAPTER FOR A MATERIAL HANDLING SYSTEM

(71) Applicant: GSI Brasil Industria e Comercio de Equipamentos Ag, Marau (BR)

(72) Inventors: Gabriel Borlina, Marau (BR); Rodrigo Barcelos Stanisci, Marau (BR); Fabio Junior Triches, Marau (BR)

(73) Assignee: GSI Brasil, Marau (BR)

( * ) Notice: Subject to any disclaimer, the term of this patent is extended or adjusted under 35 U.S.C. 154(b) by 0 days.

(21) Appl. No.: 17/031,056

(22) Filed: Sep. 24, 2020

(65) Prior Publication Data

US 2021/0087001 A1   Mar. 25, 2021

Related U.S. Application Data

(60) Provisional application No. 62/904,985, filed on Sep. 24, 2019.

(51) Int. Cl.
*B65G 53/52* (2006.01)
*B65G 11/00* (2006.01)

(52) U.S. Cl.
CPC .............. *B65G 53/52* (2013.01); *B65G 11/00* (2013.01)

(58) Field of Classification Search
CPC .................................. B65G 11/00; F16L 25/14
See application file for complete search history.

(56) References Cited

U.S. PATENT DOCUMENTS

| 3,324,534 A | 6/1967 | Spurk |
| 4,285,617 A * | 8/1981 | Gozion ............... B65G 53/56 |
| | | 193/31 R |
| 10,751,744 B2 * | 8/2020 | Loos ..................... F16L 25/14 |

FOREIGN PATENT DOCUMENTS

| CN | 201964069 U | 9/2011 | |
| CN | 202812555 U | 3/2013 | |
| CN | 104633326 A | 5/2015 | |
| CN | 204358266 U | 5/2015 | |
| GB | 1448202 A | 9/1976 | |
| GB | 2360562 A * | 9/2001 | ............... F16L 9/22 |
| WO | 2017/005189 A1 | 1/2017 | |

OTHER PUBLICATIONS

UK Intellectual Property Office, Search Report for related UK Application No. GB1917852.4, dated May 21, 2020.

* cited by examiner

*Primary Examiner* — William R Harp

(57) ABSTRACT

A material handling system has an input conduit section 12 having an input cross-sectional shape, an output conduit section 14 having an output cross-sectional shape that is different than the input cross-sectional shape, and a transition adaptor 18 connecting the input conduit section 12 and the output conduit section providing a transition between the input and output cross-sectional shapes. The transition adaptor includes a crown piece 20 that has an outer end having an elliptical sectional shape and an inner end. The transition adaptor includes a box piece 30 that has an inner end and an outer end 32 having a rectangular sectional shape, wherein the inner end of the crown piece mates with the inner end of the box piece. The box piece is formed by a first box half and a second box half 42, wherein each box half 40 is formed from a flat piece of metal and is formed by bending the box half 40 about bend lines.

7 Claims, 4 Drawing Sheets

TRANSITION ADAPTER FOR A MATERIAL HANDLING SYSTEM

CROSS REFERENCE TO RELATED APPLICATION

This application claims the benefit of U.S. Provisional Application No. 62/904,985, filed Sep. 24, 2019, which is hereby incorporated by reference in its entirety.

BACKGROUND OF THE INVENTION

Field of Invention

This invention relates generally to processing and storage facilities for particulate material such as grain, and more particularly to a transition adapter used to connect material handing conduits having differing cross-sectional shapes.

Description of Related Art

Processing and storage facilities for particulate material such as grain use conduits throughout the facility to move the material between facility components such as storage bins, elevators, tanks, silos, and other structures used to process and store the material. Oftentimes, the shape and size of the conduits used in the facility is different in various parts of the facility. Where a conduit of one shape meets up with a conduit of a different shape, adapters need to be installed to transition from the first-shaped conduit and the second-shaped conduit. Manufacturing, welding and installing these adapters can be difficult, costly and time consuming.

OVERVIEW OF THE INVENTION

In one embodiment, the invention is directed to a material handling system with an input conduit section having an input cross-sectional shape, an output conduit section having an output cross-sectional shape that is different than the input cross-sectional shape, and a transition adaptor connecting the input conduit section and the output conduit section providing a transition between the input and output cross-sectional shapes. The transition adaptor includes a crown piece that has an outer end having an elliptical sectional shape and an inner end. The transition adaptor includes a box piece that has an inner end and an outer end having a rectangular sectional shape, wherein the inner end of the crown piece mates with the inner end of the box piece. The box piece is formed by a first box half and a second box half, wherein each box half is formed from a flat piece of metal and is formed by bending the box half about bend lines.

In one embodiment, the inner end of the crown piece has four crest portions, each of the four crest portions separated from adjacent crest portions by a valley portion. Each box half has a first end and a second end opposite the first end and has a base side and a transition side opposite the base side. The transition side has a shape with a first peak and a second peak separated by a center trough, and wherein outward of the first and second peaks, the transition side slopes downward toward the first and second ends such that the box half has a height dimension at the first and second ends that is the same as a height dimension at the deepest point of the center trough. The first and second box halves are joined together such that the first and second ends form divided troughs 56 substantially similar to the center troughs. When the two box halves are bent and joined together, the box piece and crown piece are joined such that the peaks of the transition side of the box piece mate with the valley portions of the inner end of the crown piece and the center and divided troughs of the transition side of the box piece mate with the crest portions of the inner end of the crown piece These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
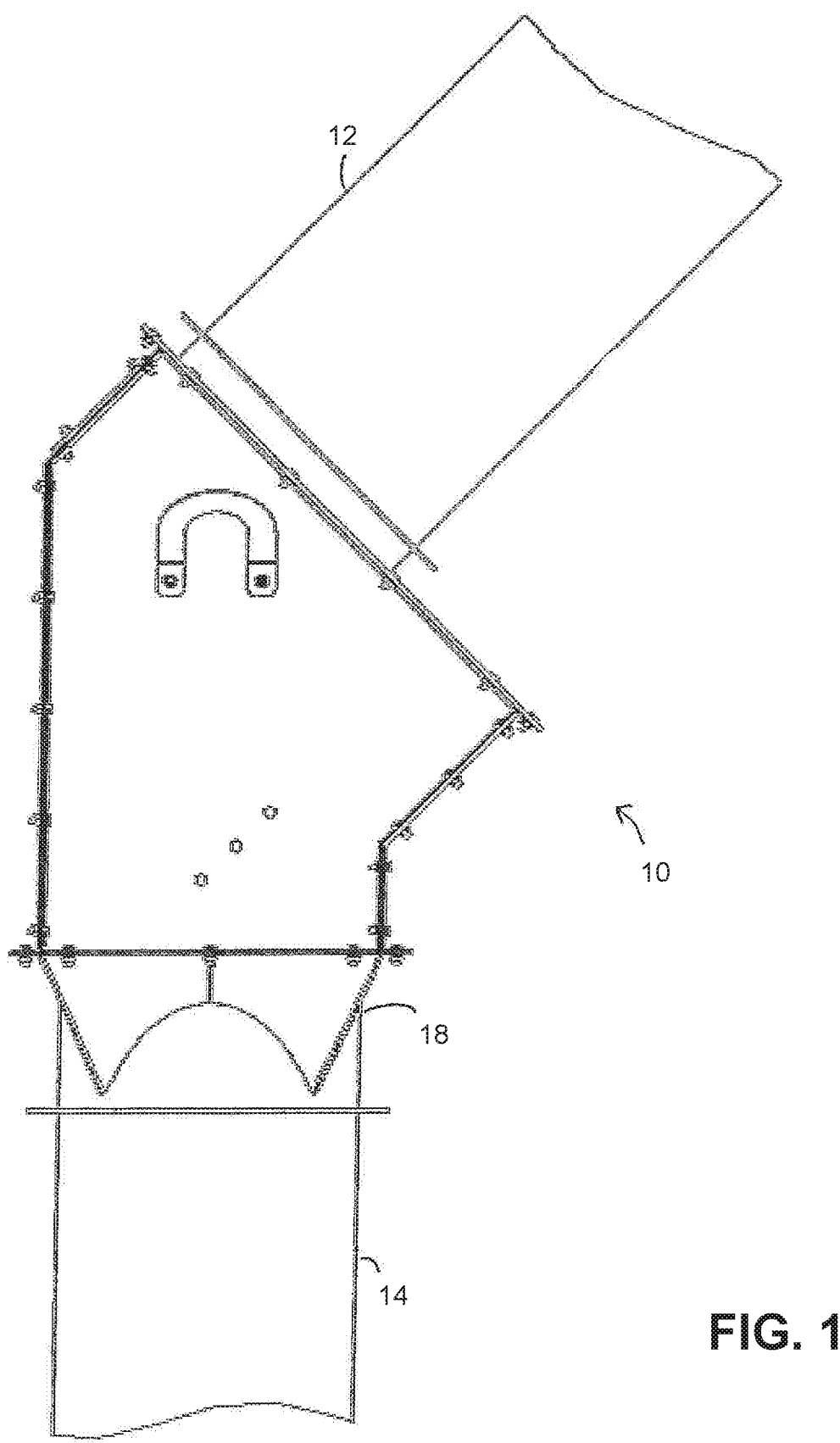
FIG. 1 is a side view of a portion of a material handling system with a transition adapter in accordance with an example embodiment.

FIG. 1 illustrates a portion of a material handling system 10 that may be used as part of a larger material processing and storage facility configured to perform various processing steps, stockpile and temporarily store the material. One will understand that the material handling system 10 may be used to move the material between a material source (not shown), such as a delivery vehicle, toward system components such as storage bins, elevators, tanks, silos, or other structures used to process and store the material, or from such structures to a material delivery component after the material has been suitably processed and stored. Furthermore, while one example embodiment of the material handling system 10 is used in a facility for the processing and storage of grain, the material handling system 10 may be used in any other material processing and storage facility, such as those used for seed, particulate fertilizer, or the like. As material processing and storage facilities are well known to those in the art and the particular invention described herein may be used in various locations in such facilities, further detail on such facilities need not be given herein.

The material handling system 10 includes an input conduit section 12 that is connected to an output conduit section 14 with a transition adaptor 18. One skilled in the art will understand that the input and output conduit sections 12, 14 may include desired bends, dividers, gates and other components as needed to suitably direct the movement of the material without departing from the scope of the invention. The input conduit section 12 has an input cross-sectional shape and the output conduit section has an output cross-sectional shape that is different than the input shape, and the transition adaptor 18 connects and provides a desirably smooth transition between the input and output shapes.

Figure 2:
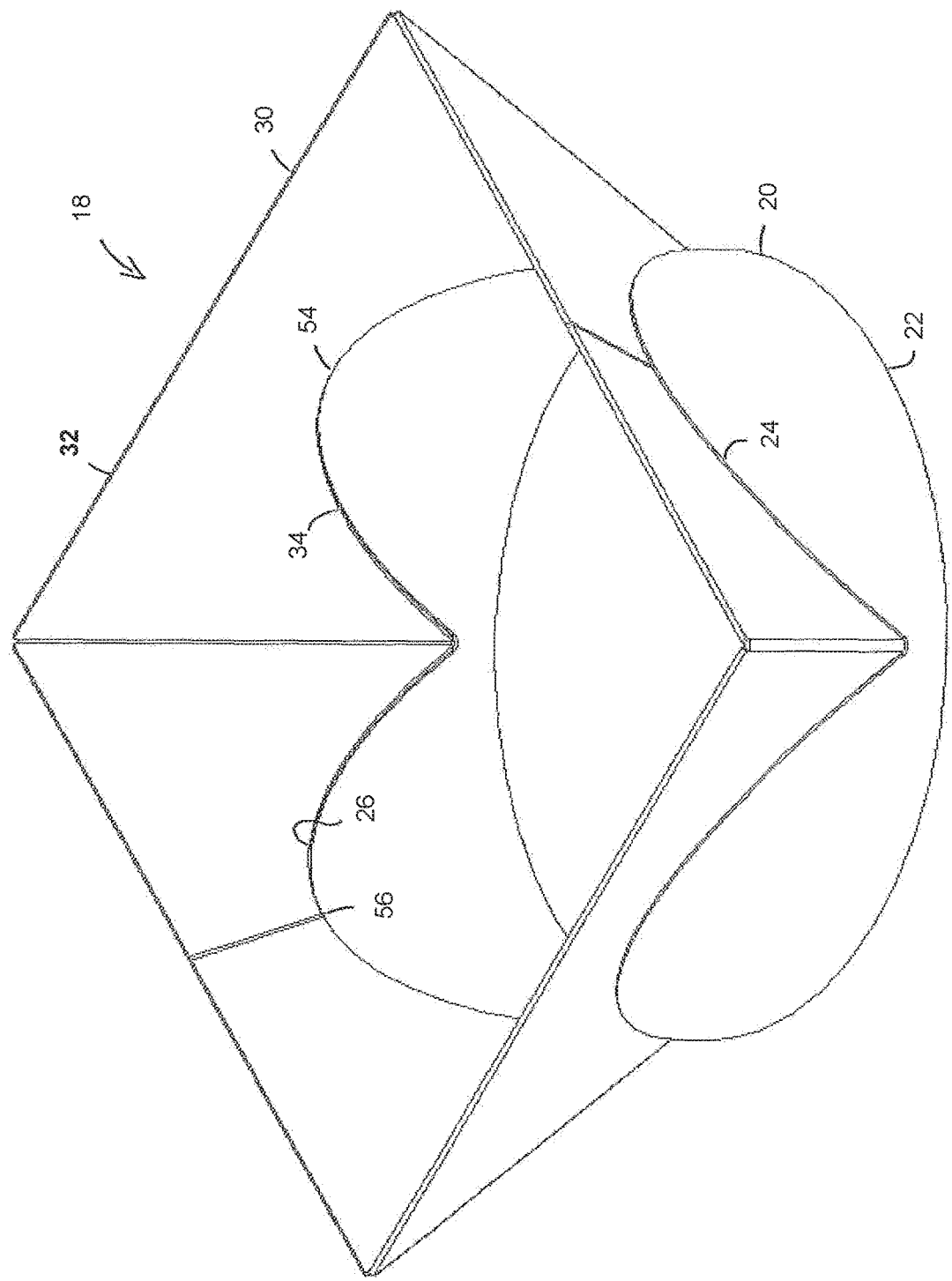
FIG. 2 is a perspective view of the transition adapter of FIG. 1.
Figure 3:
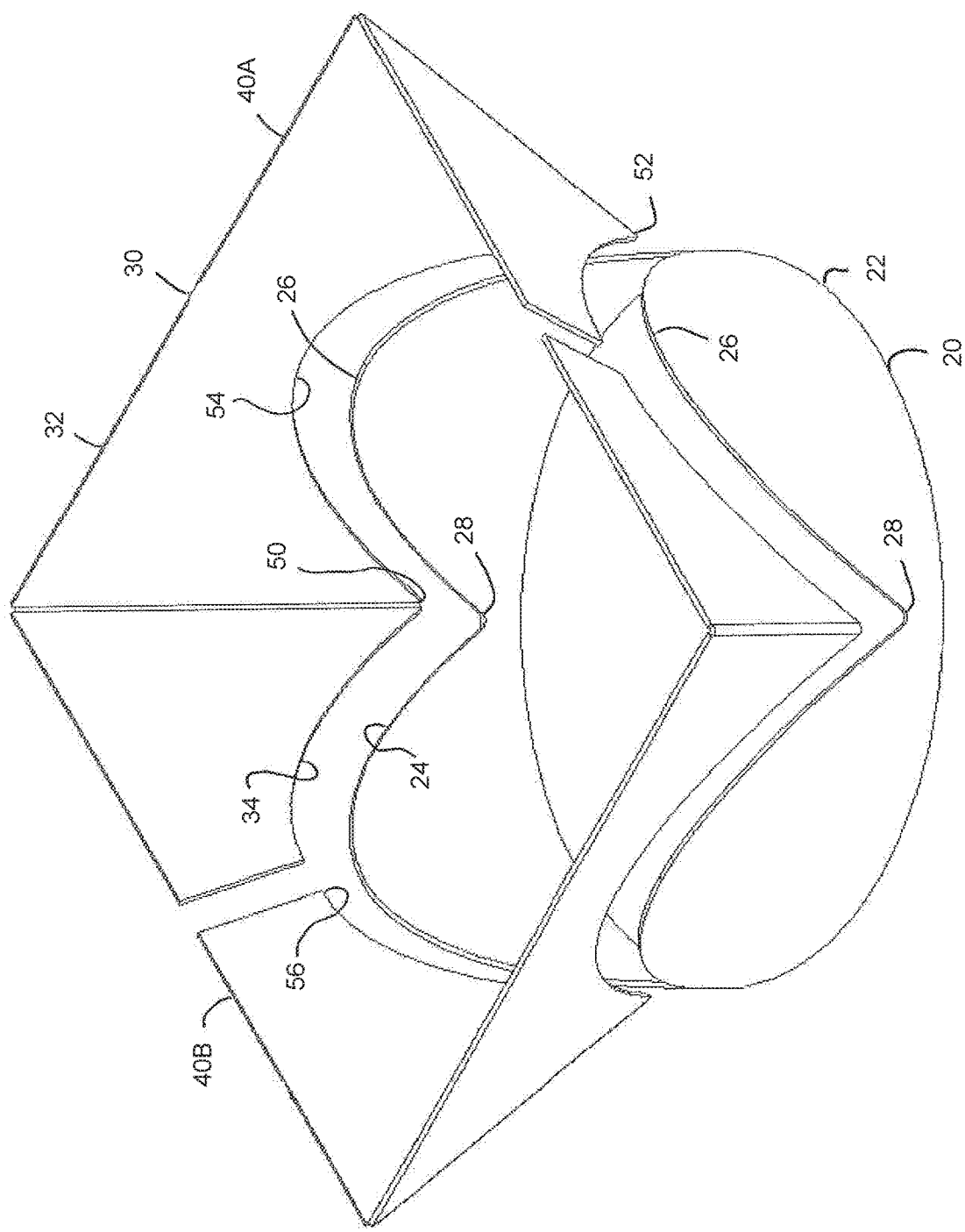
FIG. 3 is an exploded perspective view of the transition adapter of FIG. 2.

Turning also now to FIG. 2, according to the invention the transition adaptor 18 is formed with a crown piece 20 that has an outer end 22 having an elliptical sectional shape, and in the illustrated embodiment, having a circular sectional shape. The transition adaptor also has a box piece 30 that has an outer end 32 having a rectangular sectional shape, and in the illustrated embodiment, having a square sectional shape. An inner end 24 of the crown piece 20 is cut to mate with a shape of an inner end 34 of the box piece 30. Turning also now to the exploded view of FIG. 3, in one embodiment the crown piece 20 is a three-dimensionally-cut pipe section with the inner end 24 having four crest portions 26, each of the four crest portions 26 separated from adjacent crest portions 26 by a valley portion 28. In the illustrated embodiment, the box piece 30 is formed by a pair of identical box halves 40, shown as a first box half 40A and a second box half 40B. The inner ends 24, 34 of the crown and box pieces 20, 30 are welded or otherwise joined together to form the transition adaptor 18.

Figure 4:
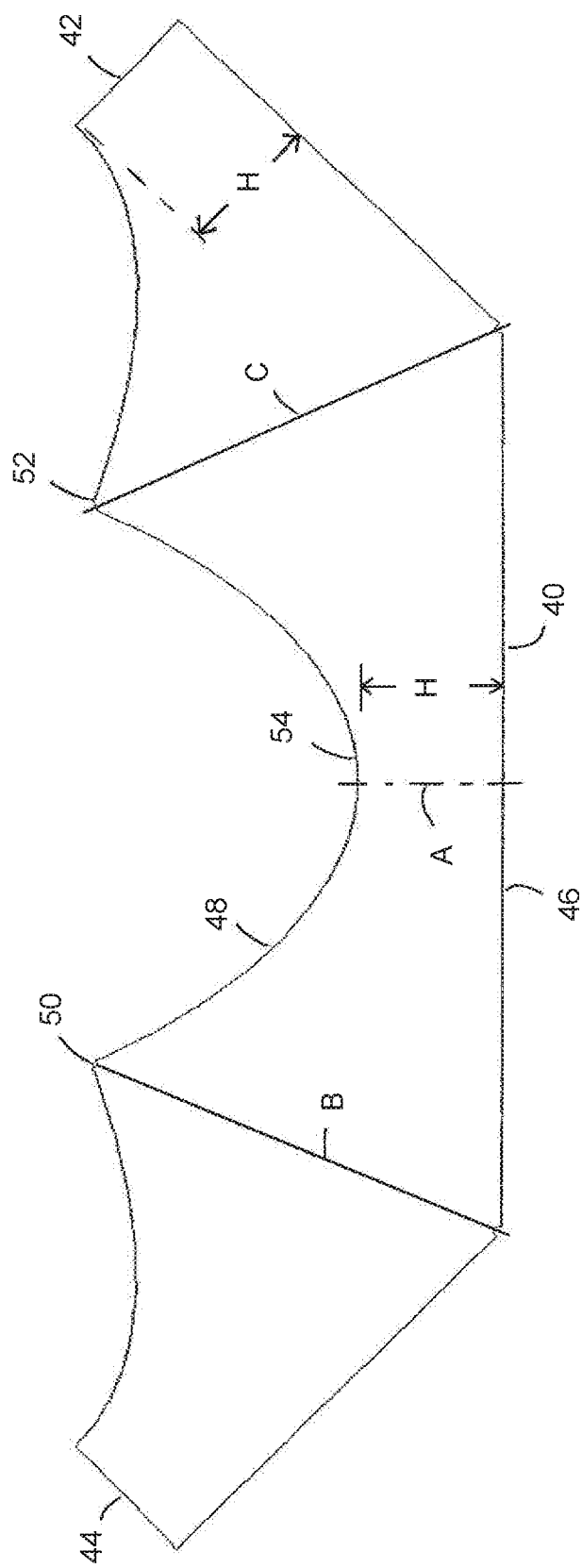
FIG. 4 is a plan view of a portion of the transition adapter of FIG. 2 before the portion has been formed into its net shape.

As best seen in FIG. 4, each box half 40 is formed from a flat sheet or plate of metal by stamping or pressing and has a first end 42 and a second end 44 opposite the first end 42 and has a base side 46 and a transition side 48 opposite the base side 46. The transition side 48 has a shape with a first peak 50 and a second peak 52 separated by a center trough 54. Outward of the first and second peaks 50, 52, the transition side 48 slopes downward toward the first and second ends 42, 44 such that the box half 40 has a height dimension (H) at the first and second ends 42, 44 that is the same as the height dimension (H) at the deepest point of the center trough 54. Thus, each box half is symmetrical about an axis (A) that runs through the deepest point of the center trough 54. Each box half 40 is formed by bending the box half 40 about bend lines (B) and (C), and the sides 42, 44 of the two box halves 40 are then joined together such that the first and second ends 42, 44 form divided troughs 56 (FIG. 2) substantially similar to the center troughs 54. After the two box halves 40 are bent about bend lines (B) and (C) and joined together, the box piece 30 and crown piece 20 are joined such that the peaks 50, 52 of the transition side 48 of the box piece 30 mate with the valley portions 28 of the inner end 24 of the crown piece 20 and the center and divided troughs 54, 56 of the transition side 48 of the box piece 30 mate with the crest portions 26 of the inner end 24 of the crown piece 20.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention are obtained by referring to the detailed description of the exemplary embodiments taken in conjunction with the accompanying drawings.

The invention claimed is:

1. A material handling system comprising an input conduit section having an input cross-sectional shape, an output conduit section having an output cross-sectional shape that is different than the input cross-sectional shape, and a transition adaptor connecting the input conduit section and the output conduit section providing a transition between the input and output cross-sectional shapes, the transition adaptor comprising:
   a crown piece that has an inner end and an outer end having an elliptical sectional shape, wherein the inner end of the crown piece has four crest portions, each of the four crest portions separated from adjacent crest portions by a valley portion;
   a box piece that has an inner end and an outer end having a rectangular sectional shape, wherein the inner end of the crown piece mates with the inner end of the box piece, wherein the box piece is formed by a first box half and a second box half, wherein each box half is formed from a flat piece of metal and is formed by bending the box half about bend lines.

2. The transition adaptor of claim 1 wherein the each box half has a first end and a second end opposite the first end and has a base side and a transition side opposite the base side, wherein the transition side has a shape with a first peak and a second peak separated by a center trough, and wherein outward of the first and second peaks, the transition side slopes downward toward the first and second ends such that the box half has a height dimension at the first and second ends that is the same as a height dimension at the deepest point of the center trough.

3. The transition adaptor of claim 2 wherein the first and second box halves are joined together such that the first and second ends form divided troughs substantially similar to the center troughs, wherein when the two box halves are bent and joined together, the box piece and crown piece are joined such that the peaks of the transition side of the box piece mate with the valley portions of the inner end of the crown piece and the center and divided troughs of the transition side of the box piece mate with the crest portions of the inner end of the crown piece.

4. The transition adaptor of claim 1 wherein the crown piece has an outer end having a circular sectional shape.

5. The transition adaptor of claim 1 wherein the box piece has an outer end having a square sectional shape.

6. The transition adaptor of claim 1 wherein the inner ends of the crown and box pieces are welded together to form the transition adaptor.

7. The transition adaptor of claim 1 wherein each box half is symmetrical about an axis that runs through a deepest point of the center trough.

* * * * *